June 10, 1924.

A. REICH 1,496,946

DEVICE FOR MEASURING THE DEFORMATION OF CRIPPLED FEET

Filed Nov. 16, 1921   4 Sheets-Sheet 1

Inventor:
Andreas Reich
by D. Kerichau
Attorney.

June 10, 1924.

A. REICH 1,496,946

DEVICE FOR MEASURING THE DEFORMATION OF CRIPPLED FEET

Filed Nov. 16 1921

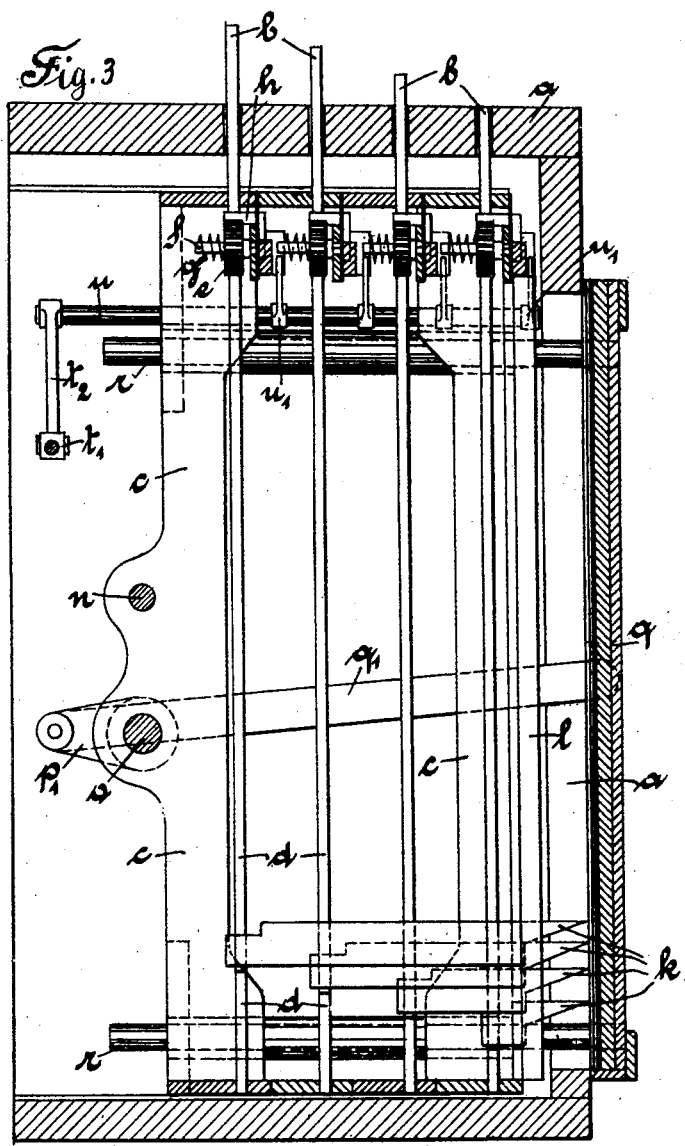

June 10, 1924. 1,496,946
A. REICH
DEVICE FOR MEASURING THE DEFORMATION OF CRIPPLED FEET
Filed Nov. 16, 1921 4 Sheets-Sheet 4
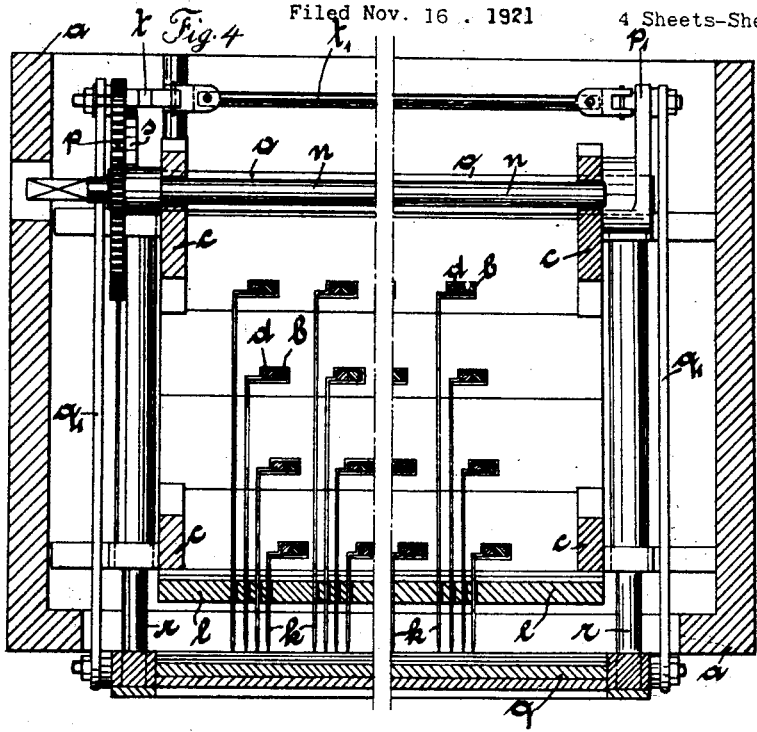
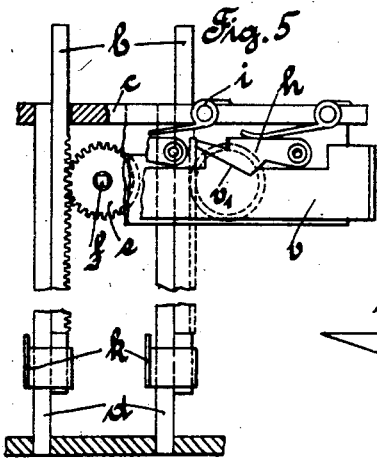
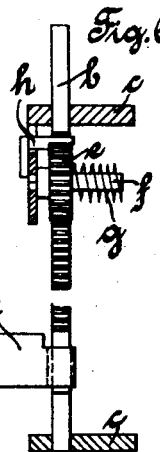
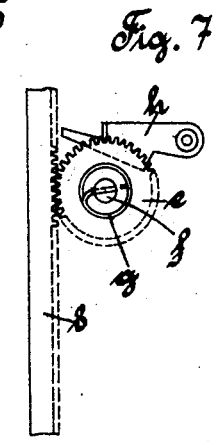

Patented June 10, 1924.

1,496,946

UNITED STATES PATENT OFFICE.

ANDREAS REICH, OF VIENNA, AUSTRIA.

DEVICE FOR MEASURING THE DEFORMATION OF CRIPPLED FEET.

Application filed November 16, 1921. Serial No. 515,637.

*To all whom it may concern:*

Be it known that I, ANDREAS REICH, of Nr. 103 Mariahilferstrasse, Vienna VI, Austria, manufacturer, a citizen of the Austrian Republic, have invented some new and useful Improvements in and Relating to a Device for Measuring the Deformation of Crippled Feet, of which the following is a specification.

This invention relates to a device capable of measuring the exact form of the sole of a crippled foot so as to make the necessary insertion in a shoe or boot in accordance with the results of the measurement. The shape of the sole is measured by means of vertically movable rods which are arranged in several rows parallel to the centre line of the sole and can be raised into contact with the sole.

According to this invention the rods, which are moved from below into contact with the sole of the foot, are mounted in a box provided with the necessary devices for moving and locking them as well as for recordng the measurements, the cover of the said box, provided with passage openings for the bars, being situated on the same level as the support for the longer foot.

In order to record the results of measurement, marking pins connected to the rods are so arranged, that by forcing a plurality of superposed marking sheets against these pins all the cross-sections measured are marked. For operating the device there is provided a common driving spindle, by which the rods, which are preferably controlled by springs, are released or locked after being set, and a frame is turned in such manner, that when it turns outwardly it takes up the marking sheets, and when returning, presses them against the marking pins of those rods, which have been set in the meantime.

The invention is more particularly described by way of example with reference to the accompanying drawings, in which—

Figure 3 is a vertical section and

Figure 4 a horizontal section with the frame in the marking position.

Figures 5 and 6 are sections in two planes at right angles to each other, and

Figure 7 is a detail view on an enlarged scale.

Figure 1:
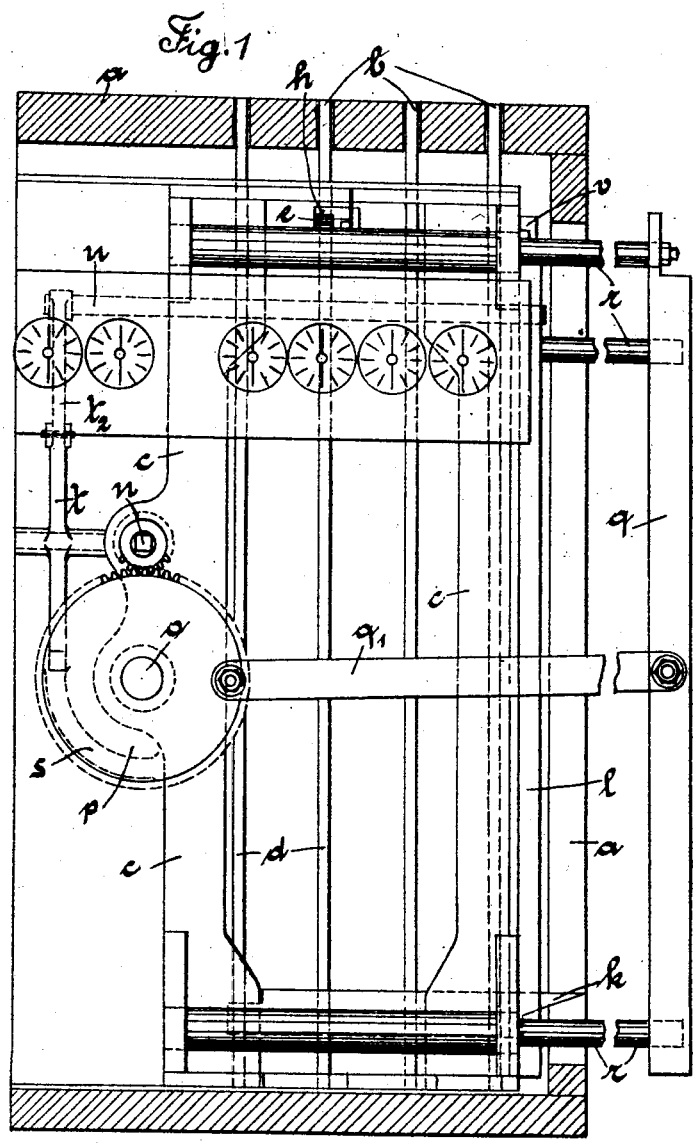
Figure 1 is an end elevation.
Figure 2:
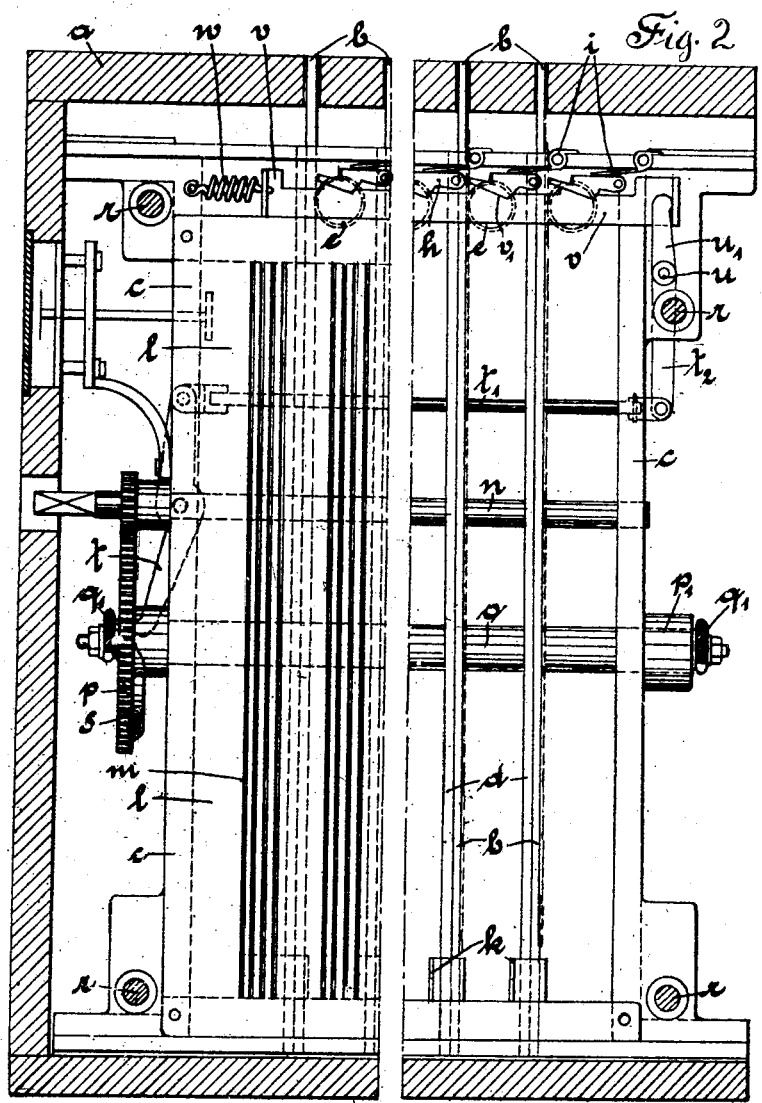
Figure 2 is a side elevation with the marking frame pulled out, the box casing being shown in section with the frame for the marking sheets cut off.

The device mounted in the casing $a$ comprises for each foot four rows of measuring rods $b$. The drawing only shows the half intended for the left foot. The rods $b$ are guided on bars $d$ fixed in the frame $a$ and project from this frame only, when the device is operated, that is to say, when the person, whose sole is to be measured, stands on the box with his weight shifted onto the other foot. The bars are in the present case designed in the form of racks, with which mesh toothed wheels $e$, loosely rotatable on fixed spindles $f$. These spindles have springs $g$ (Figs. 3 and 6), which are connected at one end to the end of the spindle, and at the other end engage a pin of the toothed wheels $e$. The springs $g$ are therefore cocked during the inward movement of the racks $b$ owing to the rotation of the toothed wheels $e$. In order to keep the rods $b$ in their position, there are provided locking pawls $h$, which are brought into engagement with the toothed wheels by springs $i$. The bottom ends of the feelers $b$ carry marking pins $k$, which are adjustable between guides $l$ and at the same time form indexes in order to render it possible to read the adjustment directly on scales $m$ (Figure 2) inserted between the guides $l$.

In the frame $c$ is mounted the driving spindle $n$, which, drives a second spindle $o$. The toothed wheel $p$ on the spindle $o$ has eccentrically mounted thereon a link $q^1$ of the recording frame $q$, and this frame is connected on the other side by means of another link $q^1$ to a crank arm $p^1$ mounted on the other end of the spindle $o$. The frame $c$ is guided by means of rails $r$ in guides in the frame $c$, and in the modification illustrated, when the spindle $o$ rotates once or the spindle $n$ four times, it is moved once outwards in order to have the marking sheets inserted therein and then moved back again in order to record the setting of the marking pins $k$ on the marking sheets inserted.

On the toothed wheel $p$ is provided a cam face $s$, which cooperates with a lever $t$, the movement of which is transmitted by a link $t'$ to a lever $t^2$, which is mounted on a spindle $u$. On this spindle there are arranged levers $u'$ in a number corresponding to the number of rows of rods $b$, and each acts on a slide $v$ provided with bevelled faces $v'$, with which engage the pawls h of the toothed wheels e. When therefore the toothed wheel p during the third quarter of its revolution causes its cam face s to rock the lever t backwards, the levers u' will be moved in such a manner, that they will pull back the slides v against the action of the springs w, and in that way disengage the locking pawls h from the toothed wheels e, so that the rods rise under the action of the springs g and engage against the sole of the foot. Such rods b as project round the foot, can be pushed in, as the locking tooth of the pawls h has a bevelled face (Figure 7), and the pawls in their engaged position therefore exert a locking action only in one direction, against the upward movement of the rods b, whilst owing to the bevelled face, they are forced back against the action of the springs i, when the rods b are forced back. The other rods b are locked in their raised position, after the cam face s has passed the lever t and after the return of the latter as well as the levers $t^2$ connected to it, to the original position, as by the said movement the slides v are again brought to their left hand position, and the pawls h engage with the toothed wheels e. When the spindle o has completed one revolution, the points of the marking pins k will have finally penetrated into the marking sheets inserted and will have marked therein the position of their respective rods, in accordance with which the profile of the sole can be ascertained.

I wish it to be understood that I do not desire to be limited to the exact details of construction shown and described, for obvious modifications will occur to a person skilled in the art.

What I claim is:

1. Measuring device for crippled feet comprising in combination, a frame, a plurality of rods parallelly disposed in said frame with their ends flush with one surface of said frame, means for raising the ends of all said rods above said surface, means for fixing each rod in any desired position and means connected with each rod for recording its position.

2. Measuring device for crippled feet comprising in combination, a frame, a plurality of rows of rods parallelly disposed in said frame with their ends flush with one surface of said frame, means for raising the ends of all said rods above said surface, means for fixing each rod in any desired position and means connected with each rod for recording its position.

3. Measuring device for crippled feet comprising in combination, a frame, a plurality of rods parallelly disposed in said frame with their ends flush with one surface of said frame, means for raising the ends of all said rods above said surface, means for fixing each rod in any desired position, a marking pin on each rod, the pointed ends of said pins being disposed in one plane and means for forcing a recording sheet against said points.

4. Measuring device for crippled feet comprising in combination, a frame, a plurality of parallel rows of rods staggeredly disposed in said frame with their ends flush with one surface of said frame, means for raising the ends of all said rods above said surface, means for fixing each rod in any desired position, a marking pin on each rod, the pointed ends of said pins extending through parallel slots in said frame and lying all in one plane, means for forcing a recording sheet against said points and a scale near each slot.

5. Measuring device for crippled feet comprising in combination, a frame, a plurality of rods parallelly disposed in said frame with their ends flush with one surface of said frame, springs for automatically raising the ends of all said rods above surface, a marking pin on each rod, a sheet carrier reciprocable relatively to said pins and a driving spindle for releasing and locking said rods and for moving said sheet carrier.

6. Measuring device for crippled feet comprising in combination, a frame, a plurality of rods parallelly disposed in said frame with their ends flush with one surface of said frame, means for raising the ends of all said rods above said surface, means for fixing each rod in any desired position and means connected with each rod for recording its position, said rods having the form of racks, toothed wheels meshing with said racks, springs operatively connected with said wheels and resilient disengageable pawls for rendering said wheels inoperative.

7. Measuring device for crippled feet comprising in combination, a frame, a plurality of rods parallelly disposed in said frame with their ends flush with one surface of said frame, means for raising the ends of all said rods above said surface, means for fixing each rod in any desired position and means connected with each rod for recording its position, said rods having the form of racks, toothed wheels meshing with said racks, springs operatively connected with said wheels, resilient disengageable pawls for rendering said wheels inoperative, wedge-shaped, spring-actuated slides adapted to cooperate with said pawls and means for simultaneously setting said slides.

Dated this twenty-eighth day of September, 1921.

In testimony whereof I have signed my name to this specification.

ANDREAS REICH.